United States Patent
Sonntag et al.

(10) Patent No.: US 11,366,898 B2
(45) Date of Patent: Jun. 21, 2022

(54) INTEGRATED CIRCUIT WITH ELECTROMAGNETIC FAULT INJECTION PROTECTION

(71) Applicant: Silicon Laboratories Inc., Austin, TX (US)

(72) Inventors: Jeffrey Lee Sonntag, Austin, TX (US); Timothy Thomas Rueger, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 133 days.

(21) Appl. No.: 16/686,486

(22) Filed: Nov. 18, 2019

(65) Prior Publication Data

US 2021/0150027 A1 May 20, 2021

(51) Int. Cl.
*G06F 21/55* (2013.01)
*H01L 23/00* (2006.01)
*G06F 21/72* (2013.01)

(52) U.S. Cl.
CPC .......... *G06F 21/556* (2013.01); *G06F 21/725* (2013.01); *H01L 23/576* (2013.01)

(58) Field of Classification Search
CPC ... G06F 21/554; G06F 21/556; H01L 23/576; H03G 3/20
See application file for complete search history.

(56) References Cited

U.S. PATENT DOCUMENTS

| | | | |
|---|---|---|---|
| 7,656,630 B2 * | 2/2010 | Bonvalot | G06K 19/073 361/78 |
| 9,697,318 B2 * | 7/2017 | Hutton | G06F 30/39 |
| 10,256,199 B2 | 4/2019 | Elenes et al. | |
| 10,289,840 B2 | 5/2019 | Elenes et al. | |
| 10,746,793 B2 * | 8/2020 | Ghalaty | G06F 21/556 |
| 10,828,785 B2 * | 11/2020 | Vahasoyrinki | G01N 33/48728 |
| 2015/0369865 A1 * | 12/2015 | Hershman | H03K 19/003 326/8 |
| 2016/0028394 A1 * | 1/2016 | Tasher | H03K 3/0375 326/8 |

(Continued)

OTHER PUBLICATIONS

Yasser Shoukry, Paul Martin, Yair Yona, Suhas Diggavi and Mani Srivastava; "Attack Resilience and Recovery using Physical Challenge Response Authentication for Active Sensors Under Integrity Attacks"; white paper; May 12, 2016; 30 pages.

(Continued)

*Primary Examiner* — Niral S Lakhia
(74) *Attorney, Agent, or Firm* — Polansky & Associates, P.L.L.C.; Paul J. Polansky

(57) ABSTRACT

In one form, an integrated circuit includes a plurality of electromagnetic fault injection (EMFI) sensors and a security management circuit. Each EMFI sensor includes a sense loop having a conductor around a corresponding portion of logic circuitry whose operation is affected by an electromagnetic pulse, and a detector circuit coupled to the sense loop and having an output for providing a pulse detection signal in response to a pulse of at least a predetermined magnitude. The security management circuit performs a protection operation to secure the integrated circuit in response to an activation of a corresponding pulse detection signal of one of the plurality of EMFI sensors.

20 Claims, 12 Drawing Sheets

(56) References Cited

U.S. PATENT DOCUMENTS

| | | | | |
|---|---|---|---|---|
| 2016/0098333 | A1* | 4/2016 | Hershman | G06F 21/75 |
| | | | | 714/41 |
| 2017/0286680 | A1* | 10/2017 | Benoit | G06F 21/75 |
| 2018/0005964 | A1* | 1/2018 | Ordas | H01L 27/0255 |
| 2018/0232542 | A1* | 8/2018 | Martin | H01L 23/576 |
| 2019/0242946 | A1* | 8/2019 | Ghalaty | G06F 21/755 |
| 2019/0372751 | A1* | 12/2019 | Yanamadala | G06K 19/07309 |
| 2020/0033907 | A1* | 1/2020 | Chossat | H03K 19/21 |
| 2020/0034572 | A1* | 1/2020 | Mundra | G06F 21/755 |
| 2020/0218808 | A1* | 7/2020 | Hershman | G06F 21/71 |
| 2021/0004461 | A1* | 1/2021 | Guilley | G01R 31/31719 |

OTHER PUBLICATIONS

Rajesh Velegalati, Robert Van Spyk and Jasper Van Wouldenberg; "Electro Magnetic Fault Injection in Practice"; white paper; Riscure NA; 550 Kearny St., Ste 330, San Francisco, CA 94108; 6 pages.
"EM-FI Transient Probe"; data sheet; Riscure BV; Frontier Building, Delftechpark 49, 2628 XJ Delft, The Netherlands; Jul. 22, 2013; 8 pages.

* cited by examiner

INTEGRATED CIRCUIT WITH ELECTROMAGNETIC FAULT INJECTION PROTECTION

FIELD

The present disclosure relates generally to security circuitry, and more particularly to tamper protection circuitry for electromagnetic fault injection protection of integrated circuits.

BACKGROUND

Hackers attempt to gain access to cryptographic integrated circuits, such as smart card controllers, in an effort to steal valuable user data, passwords, and the like. One technique hackers use is to inject electrical faults to cause circuits to malfunction in ways that give the hackers access to the memory and other resources of the integrated circuit. Hackers use multiple methods to inject faults into cryptographic circuits. Among the known methods are laser, voltage, and electromagnetic fault injection (EMFI). Laser fault injection is a popular method due to its high spatial and temporal resolutions. However, the use of lasers for fault injection has limitations. An increased number of metal layers for routing signals in a chip, as well as progressive countermeasures increase the inefficiency of laser attacks. Voltage spike injection is utilized by injecting a voltage spike directly into a substrate of a targeted integrated circuit. Voltage spike injection produces ground bounces or voltage drops according to the intensity of the spike, but it is a coarse technique because it affects many circuits on the chip.

EMFI via a targeted electromagnetic pulse is now commonly being utilized for attacks that aim to disrupt logic circuit behavior within integrated circuits. EMFI pulses are injected using very small EMFI probe tips that may be, for example, only 200 microns (μm) in diameter. These small EMFI probe tips confine the electromagnetic field disruption to a small area, allowing the hacker to disrupt only a single circuit or group of circuits and allowing the hacker to take control of the chip without disrupting the whole chip. Because they affect only a small area, these highly localized disruptions make it very difficult to detect an attempted hack using the EMFI pulse technique.

Figure 1:
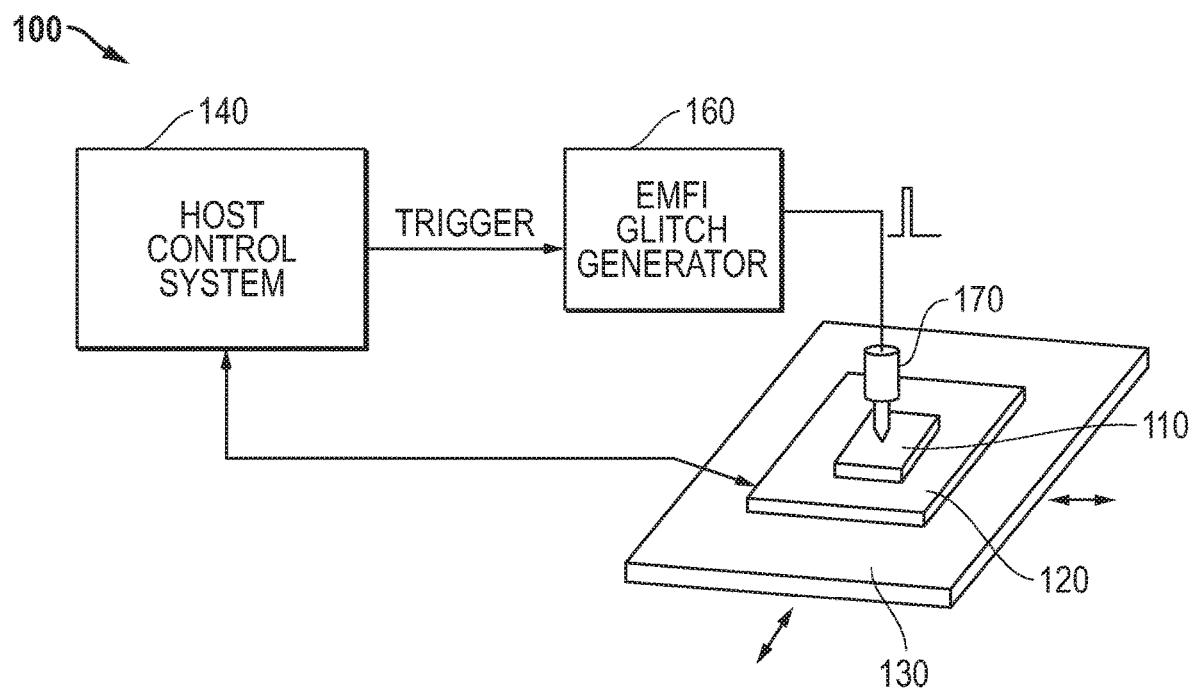
FIG. 1 illustrates in block diagram form an electromagnetic fault injection (EMFI) system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

FIG. 1 illustrates in block diagram form an electromagnetic fault injection (EMFI) system 100 known in the prior art. EMFI system 100 includes generally an integrated circuit 110, a circuit board 120, a movable platen 130, a host control system 140, an EMFI glitch generator 160, and an EMFI probe 170. Integrated circuit 110 is mounted on and electrically connected to circuit board 120. Circuit board 120 rests on movable platen 130. A motorized stepper system, not shown in FIG. 1, is used to move movable platen 130 horizontally and vertically in small steps. Host control system 140 is bidirectionally connected to circuit board 120 and is capable of sending electrical test patterns to integrated circuit 110 through circuit board 120 and measuring electrical response outputs from integrated circuit 110 through circuit board 120. Host control system 140 also has an output for providing a trigger signal to EMFI glitch generator 160. EMFI glitch generator 160 provides a high voltage pulse of short duration to EMFI probe 170. EMFI probe 170 then radiates a magnetic field that can cause integrated circuit 110 to fail.

Host control system 140 executes an EMFI sweep on integrated circuit 110. For example, a hacker may attempt to cause a program failure to allow it to input invalid boot firmware to integrated circuit 110, in which case the invalid boot firmware would allow the hacker to inspect and alter internal registers. EMFI glitch generator 160 provides a high energy spike or impulse of either positive or negative polarity to EMFI probe 170, which generates an EMFI pulse to a localized area of integrated circuit 110. EMFI probe 170 is a miniaturized EMFI injector positioned above a particular location in integrated circuit 110. For example, EMFI probe 170 discharges a capacitor bank into a coil upon receiving the impulse from EMFI glitch generator 160, thereby creating an EMFI. EMFI glitch generator 160 waits a predefined time (glitch offset) from a reference event, such as system reset that host control system 140 provides to integrated circuit 110 through circuit board 120, and emits a pulse when host control system 140 asserts the TRIGGER signal. Host control system 140 communicates with circuit board 120 and monitors the behavior of integrated circuit 110.

The motorized stepper system manipulates movable platen 130, and therefore integrated circuit 110, relative to EMFI probe 170. Host control system 140 initiates a glitch sweep of the EMFI pulses across the surface of integrated circuit 110 until it causes a firmware authentication operation to malfunction in a desirable way, for example during boot of integrated circuit 110. Eventually host control system 140 can determine a desired position for EMFI probe 170 and desired glitch offset that caused the failure to occur, such as during the firmware boot authentication operation, allowing host control system 140 to supply instructions that allow memory on integrated circuit 110 to be read and altered.

Figure 2:
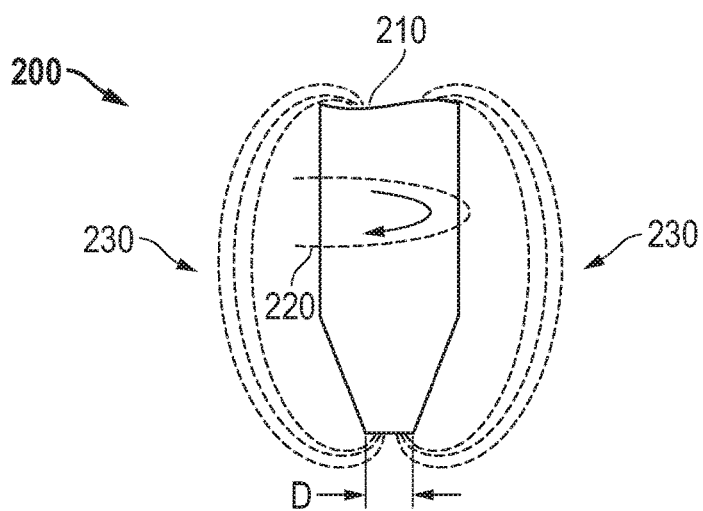
FIG. 2 illustrates in a side view of an EMFI probe tip and the magnetic fields generated from it.

FIG. 2 illustrates in a side view of an electrical field model 200 created by an EMFI probe tip 210. EMFI probe tip 210 extends downward and tapers to a point with a width labeled "D". Width D can be, for example, about 0.2 millimeters (mm)/200 microns (μm). A loop 220 of wire is used to create a current flow in the clockwise direction. FIG. 2 shows loop 220 as one turn of wire but in general is formed with one or more turns of wire around EMFI probe tip 210. Shown in FIG. 2 are electromagnetic field lines 230 extending along probe tip 210 around loop 220. Probe tip 210 creates electromagnetic field lines 230 caused by a large step increase in current caused by EMFI glitch generator, such as EMFI glitch generator 160 of FIG. 1. However, the EMFI glitch is localized around EMFI probe tip 210, and generally decreases with the square of the distance from EMFI probe tip 210.

Figure 3:
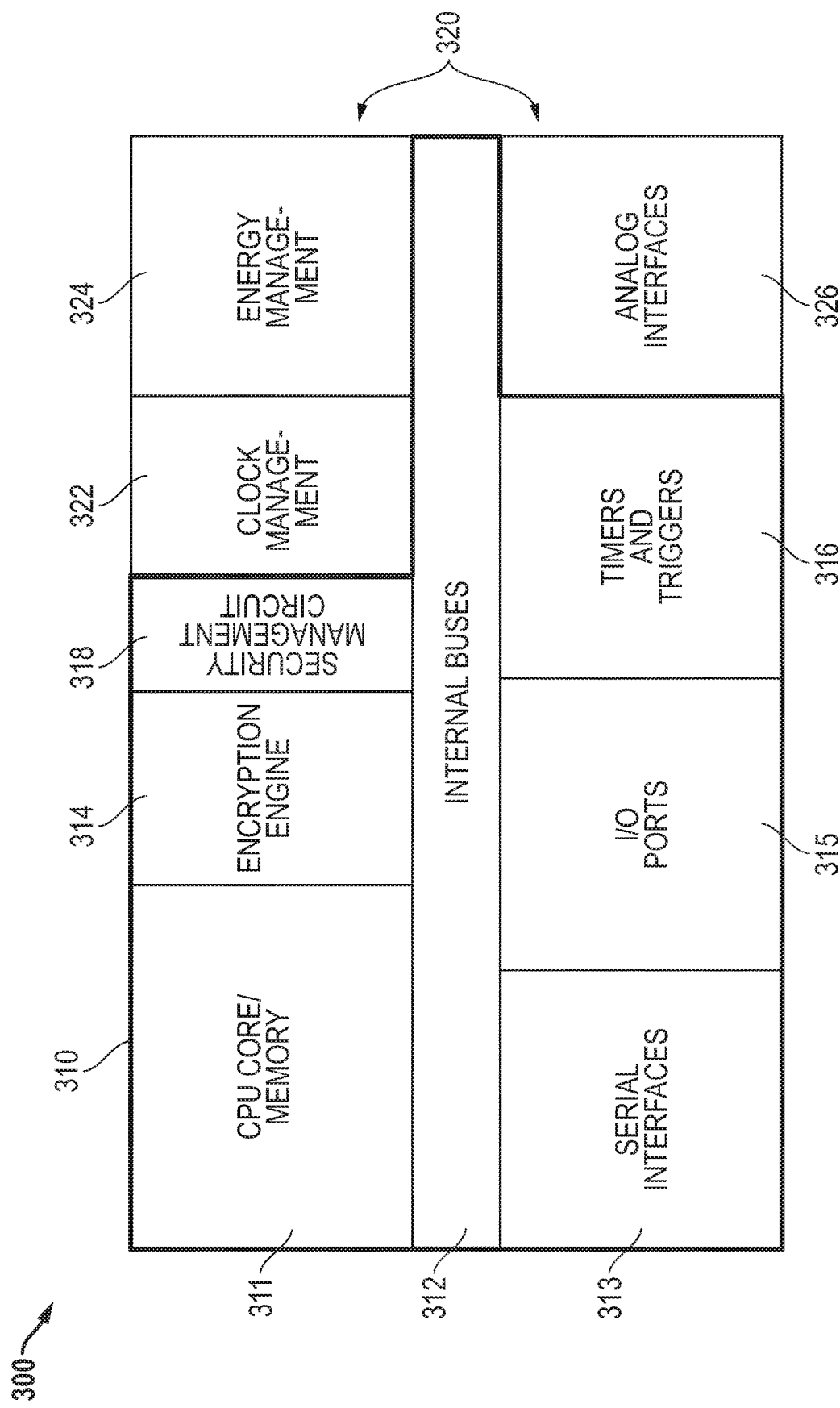
FIG. 3 illustrates in block diagram form a microcontroller unit (MCU) that may be subject to hacking using EMFI techniques.

FIG. 3 illustrates in block diagram form an integrated circuit 300 that may be subject to hacking using EMFI techniques. Integrated circuit 300 is a microcontroller unit (MCU) formed on a single chip and includes generally a digital logic circuit area 310 and an analog circuit area 320.

Digital logic circuit area 310 includes a central processing unit and memory block 311, a set of internal buses 312, a set of serial interfaces 313, an encryption engine 314, a set of input/output (I/O) ports 315, a set of timers and triggers 316, and a security management circuit 318. Digital logic circuit area 310 illustrates a representative set of digital circuits commonly found in integrated circuit MCUs, and other integrated circuit MCUs will have various combinations of these and similar digital circuit blocks.

Analog circuit area 320 includes a clock management circuit 322, an energy management circuit 324, and a set of analog interfaces 326. Analog circuit area 320 illustrates a representative set of analog circuits commonly found in integrated circuit MCUs, and other integrated circuit MCUs will have various combinations of these and similar analog circuit blocks.

Notably, attempts to hack integrated circuit MCUs are generally focused on digital circuits such as those in digital logic circuit area 310. A successful hack may result from changing the results of a conditional branch operation that allows the branch to take the wrong branch, offering the opportunity for the hacker at a critical point in program execution to supply program code to take control of the operation of the MCU, to read the state of registers, and eventually to understand the software and read critical data.

For example, a cryptographic certificate can be utilized to delegate host firmware development and debug access to an authorized developer. An EMFI pulse can be injected into the integrated circuit during cryptographic authentication, which may use encryption engine 314. The control program, real-time operating system, or the like may validate the signature, which is not known to the hacker. If the EMFI pulse is applied during the process of signature validation, even though the hacker inputs an invalid signature, the result could be incorrectly evaluated to be valid, and the firmware can then be booted from an external source, such as malicious firmware provided by the hacker.

As will be described below, however, integrated circuit 300 includes circuitry that is capable of detecting highly localized EMFI pulses in digital logic circuit area 310, and providing a pulse detection signal to security management circuit 318. Security management circuit 318 can then take appropriate counter-measures, i.e. perform a protection operation. These counter-measures can include resetting integrated circuit 300, selectively erasing sensitive information from integrated circuit 300, enabling a debug interface to invalidate a cryptographic authentication operation and lock access to the debug interface, and erasing secrets and/or functions of integrated circuit 300.

Integrated circuit 300 uses EMFI sensors in conjunction with security management circuit 318. An EMFI sensor in turn includes a sense loop and a detector circuit. An EMFI attack generates localized areas of large but transient magnetic fields to disrupt circuit traces on a localized basis. The sizing of the sense loop depends on the expected dimensions of the EMFI probe; currently, probes on the order of 200 μm in diameter are known to be in use.

The magnetic field strength of an EMFI pulse can be analyzed in terms of the probe diameter and the height of the probe above the integrated circuit die. The voltage induced on a victim signal or a detector loop within the targeted integrated circuit is proportional to the time derivative of the component of the magnetic field perpendicular to the surface of the integrated circuit, i.e., the z-component. The induced voltage is also proportional to the surface integral of the z-component of the time derivative of the magnetic field. For detector loops (and victim signal traces) much smaller than the area across which the attacker's magnetic field is large, the integral (and therefore the voltage) is roughly proportional to the area of the detector loop. But when the detector loop is much larger than the attacker's magnetic field, the detector loop encompasses regions in which the field polarity has reversed; thus, for very large detector loop area, the integral (and therefore the voltage) approaches zero with increasing loop size. The detector loops are sized substantially larger than victim signal traces, so that the detector may be more sensitive than the traces of the victim signals, but are not much larger than the attacker's field size. Moreover, a single large loop may not be an effective solution, unless the circuitry to be defended is smaller than the attacker's magnetic field.

Therefore, based on the expected size of attacker probes, and considering reasonable limits that can be applied to the length of victim signal traces, the inventors have found that on-chip EMFI pulse detection loops on the order a few hundred microns wide and high are preferable.

If a digital core or discrete area of digital logic circuitry on the integrated circuit die is larger than this size, then multiple loops can be used together to cover the digital core. This situation will now be described.

Figure 4:
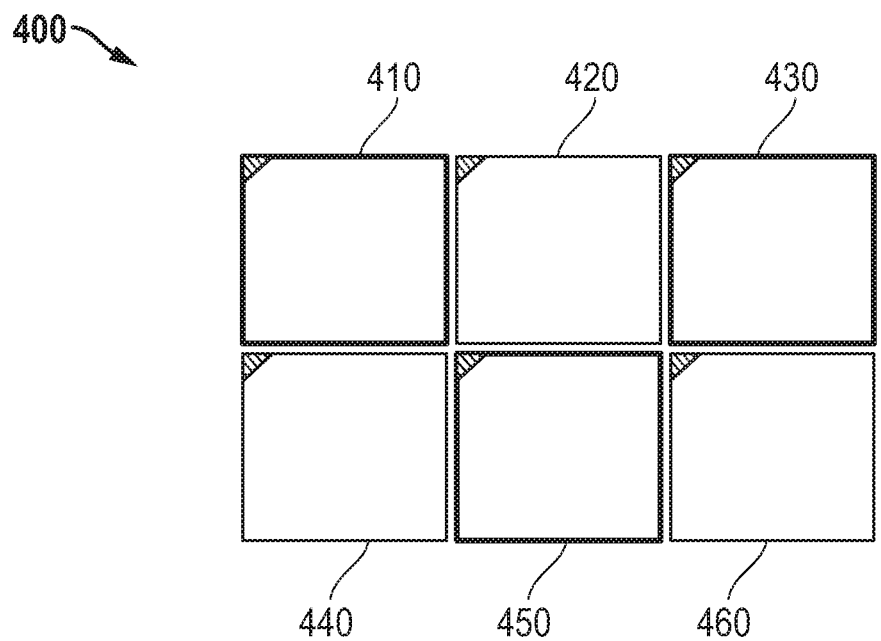
FIG. 4 illustrates a top view of an EMFI sensor array that can detect an EMFI pulse in an area of an integrated circuit according to an embodiment of the present disclosure.

FIG. 4 illustrates a top view of an EMFI sensor array 400 that can detect an EMFI pulse in an area of an integrated circuit according to an embodiment of the present disclosure. EMFI sensor array 400 includes an array of EMFI sensors including representative EMFI sensors 410, 420, 430, 440, 450, and 460 in an array of two rows and three columns. Each EMFI sensor is shown as a rectangle having a small triangle in the upper left corner. The rectangle represents a sense loop formed with one or more turns of conductors around a corresponding portion of logic circuitry (not separately shown in FIG. 4) whose operation is affected by an EMFI pulse. The sense loop can be formed with one or more conductors around a periphery of the sense loop. The small triangle represents a detector circuit that is connected to the sense loop that has an output for providing a pulse detection signal in response to an EMFI pulse of at least a certain magnitude.

A security management circuit, such as security management circuit 318 of FIG. 3, is connected to the outputs of detector circuits 410-460 in corresponding EMFI sensors and performs a protection operation to secure integrated circuit 300 in response to an activation of a corresponding pulse detection signal of one or more EMFI sensors of EMFI sensor array 400. Each EMFI sensor has a sense loop that is small enough to detect an EMFI pulse from a nearby EMFI probe having a certain diameter. For example, if the diameter is 200 µm, then sense loops 410-460 are small enough to detect sufficient energy if the EMFI probe were in the center, farthest from any part of the sense loop.

Advantageous details of the construction of the sense loops and security management circuits will now be described with reference to several particular examples.

Figure 5:
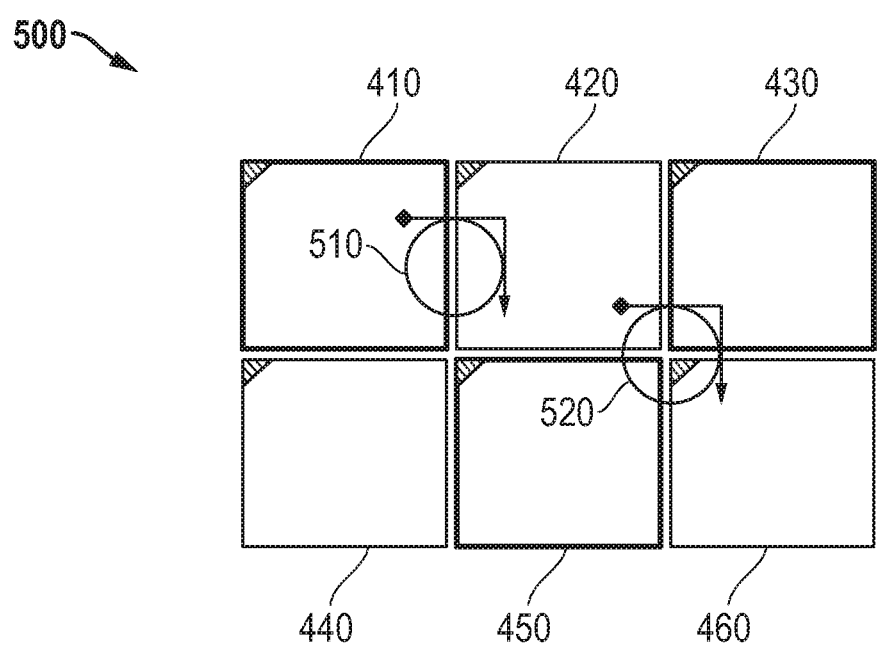
FIG. 5 illustrates a top view of the EMFI sensor array of FIG. 4 when an EMFI probe tip is placed at two exemplary points.

FIG. 5 illustrates a top view 500 of EMFI sensor array 400 of FIG. 4 when an EMFI probe tip is placed at two exemplary positions 510 and 520. EMFI attack detection sensitivity is reduced if the magnetic field is focused along a loop boundary since no single loop integrates the entire field. For example, when placed at position 510, the EMFI probe tip crosses the sense loops of EMFI sensors 410 and 420. When placed at position 520, the EMFI probe tip crosses the sense loops of EMFI sensors 420, 430, 450, and 460. Using EMFI sensor array 400, the detector circuit in each EMFI sensor has to be robust enough to detect the reduced energy in these conditions.

Figure 6:
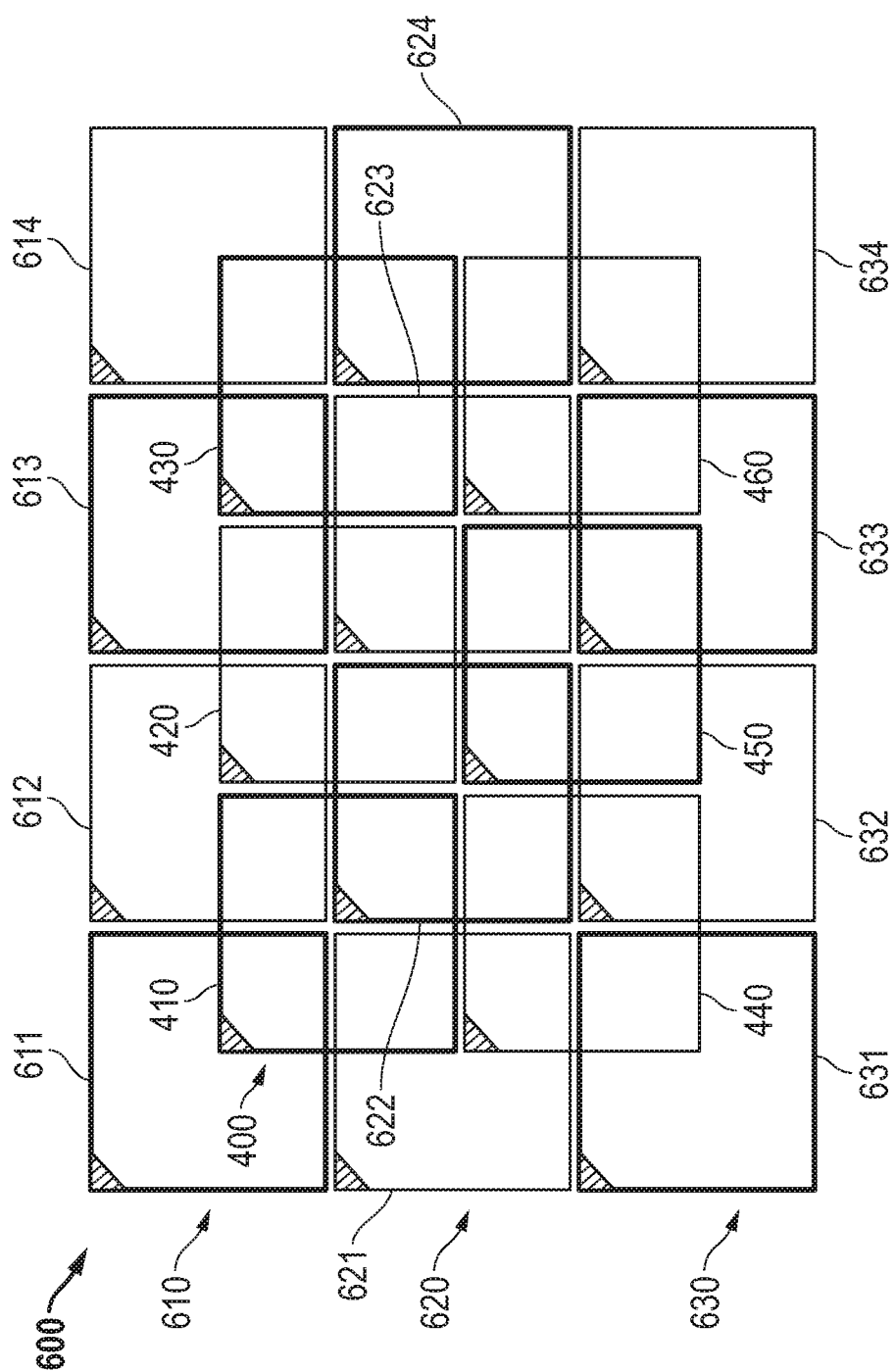
FIG. 6 illustrates a top view of an EMFI sensor array with overlapping sets of sense loops according to another embodiment of the present disclosure.

FIG. 6 illustrates a top view of an EMFI sensor array 600 with overlapping sets of sense loops according to another embodiment of the present disclosure. EMFI sensor array 600 has two overlapping sets of EMFI sensors, including EMFI sensor array 400 as described with respect to FIG. 4 above, and an EMFI sensor array 600. EMFI sensor array 600 includes three rows of non-overlapping sense loops include a row 610, a row 620, and a row 630. Row 610 includes EMFI sensors 611, 612, 613, and 614. Row 620 includes EMFI sensors 621, 622, 623, and 624. Row 630 includes EMFI sensors 631, 632, 633, and 634. Each EMFI sensor is again shown as a rectangle having a small triangle in the upper left corner, in which the rectangle represents a sense loop formed with one or more conductors around a corresponding portion of logic circuitry (not shown in FIG. 6), and the small triangle represents a detector circuit that is connected to the sense loop and has an output for providing a pulse detection signal in response to an EMFI pulse of at least a certain magnitude. FIG. 6 shows how sensitivity can be increased by adding an overlapping layer of sense loops that reduce the chance that the EMFI probe will be positioned in a place that the magnetic field cancels out in the most adjacent loop but is too weak to be detected by any other loop.

Figure 7:
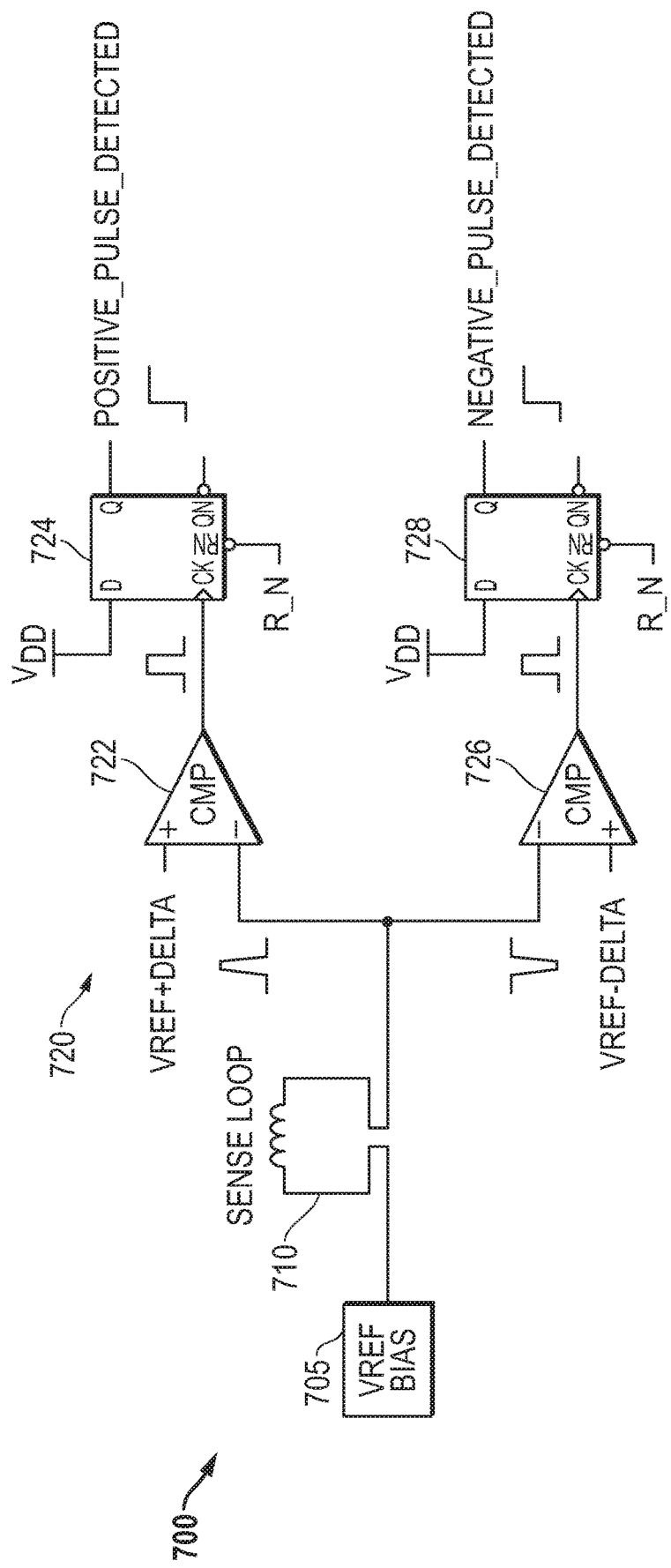
FIG. 7 illustrates in partial block diagram and partial schematic form an EMFI sensor that can be used in the EMFI sensors of FIGS. 4 and 6.

FIG. 7 illustrates in partial block diagram and partial schematic form an EMFI sensor 700 that can be used as EMFI sensors 400 and 600 of FIGS. 4 and 6, respectively. EMFI sensor 700 includes generally a bias circuit 705, a sense loop 710, and a detector circuit 720. Bias source 705 has an output for providing a bias voltage labelled "$V_{REF}$". $V_{REF}$ can be, for example, a voltage approximately halfway between a positive power supply voltage labeled "$V_{DD}$" and ground. Sense loop 710 has a first end connected to the output of bias circuit 705, and a second end. Detector circuit 720 includes a comparator 722, a flip-flop 724, a comparator 726, and a flip-flop 728. Comparator 722 has a positive input for receiving a voltage labeled "$V_{REF}$ DELTA", a negative input connected to the second end of sense loop 710, and an output. Flip-flop 724 is a clocked D flip-flop having a D input connected to a power supply voltage terminal that provides power supply voltage $V_{DD}$, a clock input labeled "CK" connected to the output of comparator 722, an active-low reset input labeled "RN" for receiving a reset signal labeled "R_N", and a Q output providing a signal labeled "POSITIVE_PULSE_DETECTED". Comparator 726 has a positive input for receiving a voltage labeled "$V_{REF}$-DELTA", a negative input connected to the second end of sense loop 710, and an output. Flip-flop 728 is a clocked D flip-flop having a D input connected to a power supply voltage terminal that provides power supply voltage $V_{DD}$, a CK input connected to the output of comparator 726, an active-low reset input RN for receiving reset signal R_N, and a Q output providing a signal labeled "NEGATIVE_PULSE_DETECTED".

In operation, EMFI sensor 700 uses a single sense loop, sense loop 710, to detect both positive and negative EMFI pulses. The first end of sense loop 710 receives $V_{REF}$, a voltage that is about halfway between $V_{DD}$ and ground. At the beginning of operation, integrated circuit 300 activates the R_N signal, resetting flop-flops 724 and 728 and causing their Q outputs to go low. The circuit branch formed by comparator 722 and flip-flop 724 detects a positive EMFI pulse. When the second end of sense loop 710 rises above $V_{REF}$+DELTA, the output of comparator 722 goes high, causing flip-flop 724 to latch the logic high on the D input and thereby latch the POSITIVE_PULSE_DETECTED signal at the Q output thereof. The circuit branch formed by comparator 726 and flip-flop 728 detects a negative EMFI pulse. When the second end of sense loop 710 falls below $V_{REF}$+DELTA, the output of comparator 726 goes high, causing flip-flop 728 to latch the logic high on the D input and thereby latch the NEGATIVE_PULSE_DETECTED signal at the Q output thereof. Thus detector circuit 720 detects and latches transient EMFI events in either the positive or negative directions.

Although FIG. 7 shows the same DELTA value for both the positive and negative branches, in other embodiments different DELTA values can be used to accommodate asymmetry in circuit operation. Detector circuit 720 represents a conceptualized ideal detector circuit. However, the use of the mid-supply bias circuit 705 dissipates power and requires at least some significant amounts of circuitry, e.g. for comparators 722 and 726. Thus, in some embodiments it may fail to satisfy design requirements for reducing the power consumption to near zero in certain low-power states.

Moreover, many integrated circuits are implemented using standard cells and circuitry that is auto-routed in a standard cell core area. Thus, it is difficult to embed distributed EMFI sensors in the standard cell core area, unless the distributed EMFI sensors are also implemented using standard cells and capable of being auto-routed at the same time the surrounding circuitry is routed.

Figure 8:
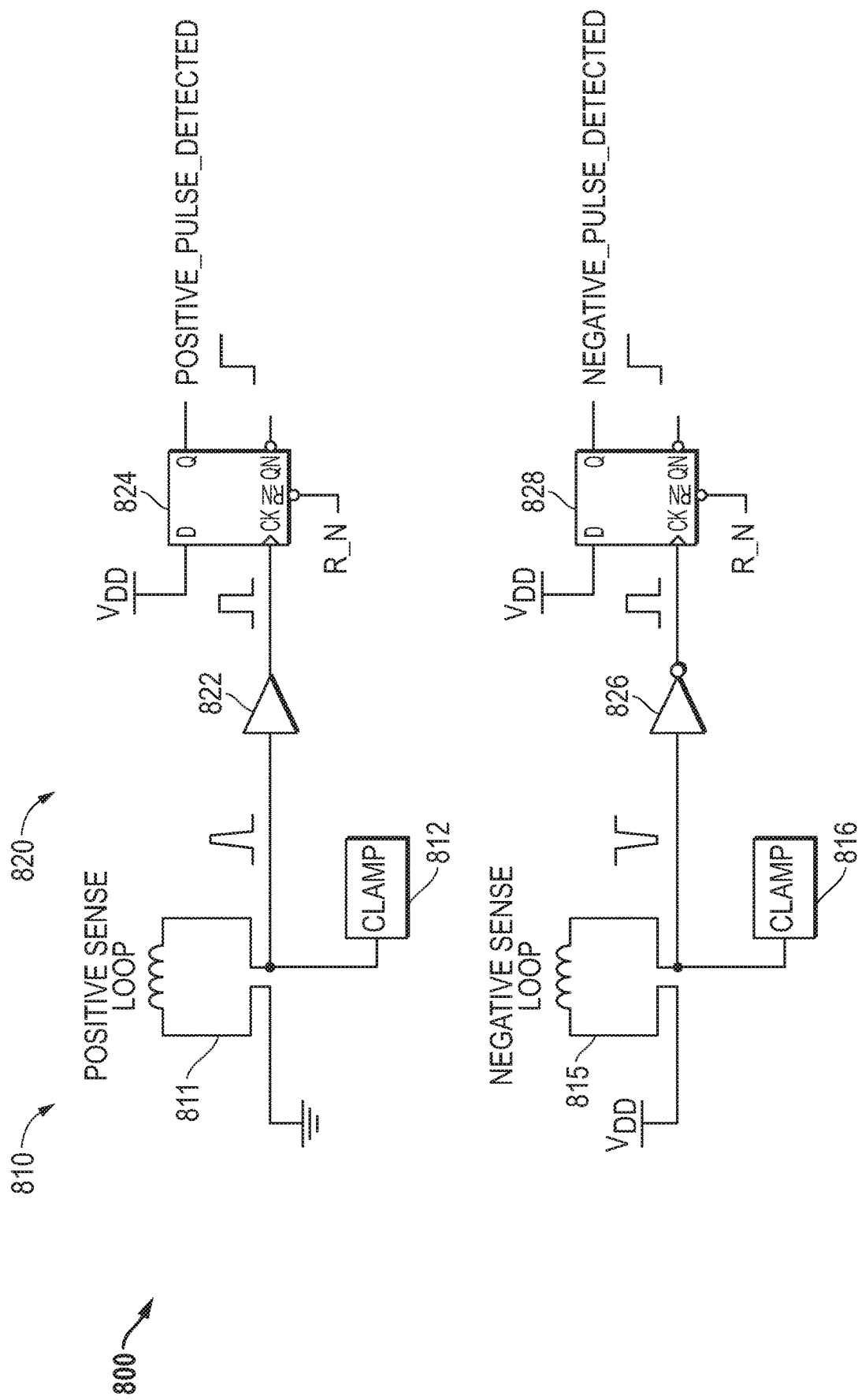
FIG. 8 illustrates in partial block diagram and partial schematic form another EMFI sensor that can be used in the EMFI sensors of FIGS. 4 and 6.

FIG. 8 illustrates in partial block diagram and partial schematic form another EMFI sensor 800 that can be used in EMFI sensors 400 and 600 of FIGS. 4 and 6, respectively. EMFI sensor 800 includes separate positive and negative sense loops and positive and negative detector circuit branches. EMFI sensor 800 includes a sense loop portion 810 and a detector circuit portion 820.

Sense loop portion 810 includes a positive sense loop 811, a clamp 812, a negative sense loop 815, and a clamp 816. Positive sense loop 811 has a first end connected to ground, and a second end. Clamp 812 is connected to the second end of positive sense loop 811. Negative sense loop 815 has a first end connected to $V_{DD}$, and a second end. Clamp 816 is connected to the second end of negative sense loop 815.

Detector circuit portion 820 includes a comparator 822, a flip-flop 824, a comparator 826, and a flip-flop 828. Comparator 822 has an input connected to the second end of sense loop 811, and an true output. Flip-flop 824 is a clocked D flip-flop having a D input connected to $V_{DD}$, a clock input CK connected to the output of comparator 822, an active-low reset input RN for receiving a reset signal R_N, and a Q output providing the POSITIVE_PULSE_DETECTED signal. Comparator 826 has an input connected to the second end of sense loop 815, and a complementary output. Flip-flop 828 is a clocked D flip-flop having a D input connected to $V_{DD}$, a clock input CK connected to the output of comparator 826, an active-low reset input RN for receiving a reset signal R_N, and a Q output providing the NEGA-TIVE_PULSE_DETECTED signal.

Positive sense loop 811 and negative sense loop 815 can be routed adjacent to one another to reduce the impact on the integrated circuit layout. For the positive detector branch, the second end of positive sense loop 811 is driven to a logic low normally through the connection of a first end of positive sense loop 811 to ground. An EMFI pulse creates a positive-going pulse on a second end of positive sense loop 811, i.e., a voltage increase when measured with respect to ground. Clamp 812 clamps the voltage at a high level that is high enough to be recognized by comparator 822 but is limited to a level that will not harm the transistors in comparator 822. Comparator 822 sends a well-formed logic high pulse to flip-flop 824. Flip-flop 824 captures the positive pulse and activates the POSITIVE_PULSE_DE-TECTED signal at a logic high level. For the negative detector branch, a second end of negative sense loop 815 is driven to a logic high normally through the connection of a first end to $V_{DD}$, i.e., a voltage decrease when measured with respect to ground. An EMFI pulse creates a negative-going pulse on the second end of negative sense loop 815. Clamp 816 clamps the voltage at a low level that is low enough to be recognized by comparator 826 but is limited to a level that will not harm the transistors in comparator 826. Comparator 826 sends a well-formed logic high pulse to flip-flop 828. Flip-flop 828 captures the positive pulse event and activates the POSITIVE_PULSE_DETECTED signal at a logic high level.

In an exemplary embodiment, comparator 822 is formed by two CMOS inverters connected in series whose switch-point is used for an implicit comparison, and comparator 826 is formed as a single CMOS inverter. Likewise flip-flops 824 and 828 can be formed using CMOS transistors. Thus, EMFI sensor 800 consumes little power and only consumes power during switching, which will reduce the power to very small leakage power. In addition, comparator 822, comparator 826, and flip-flops 824 and 828 can be easily formed with only a small amount of circuitry using basic CMOS logic gates in a standard cell area.

Figure 9:
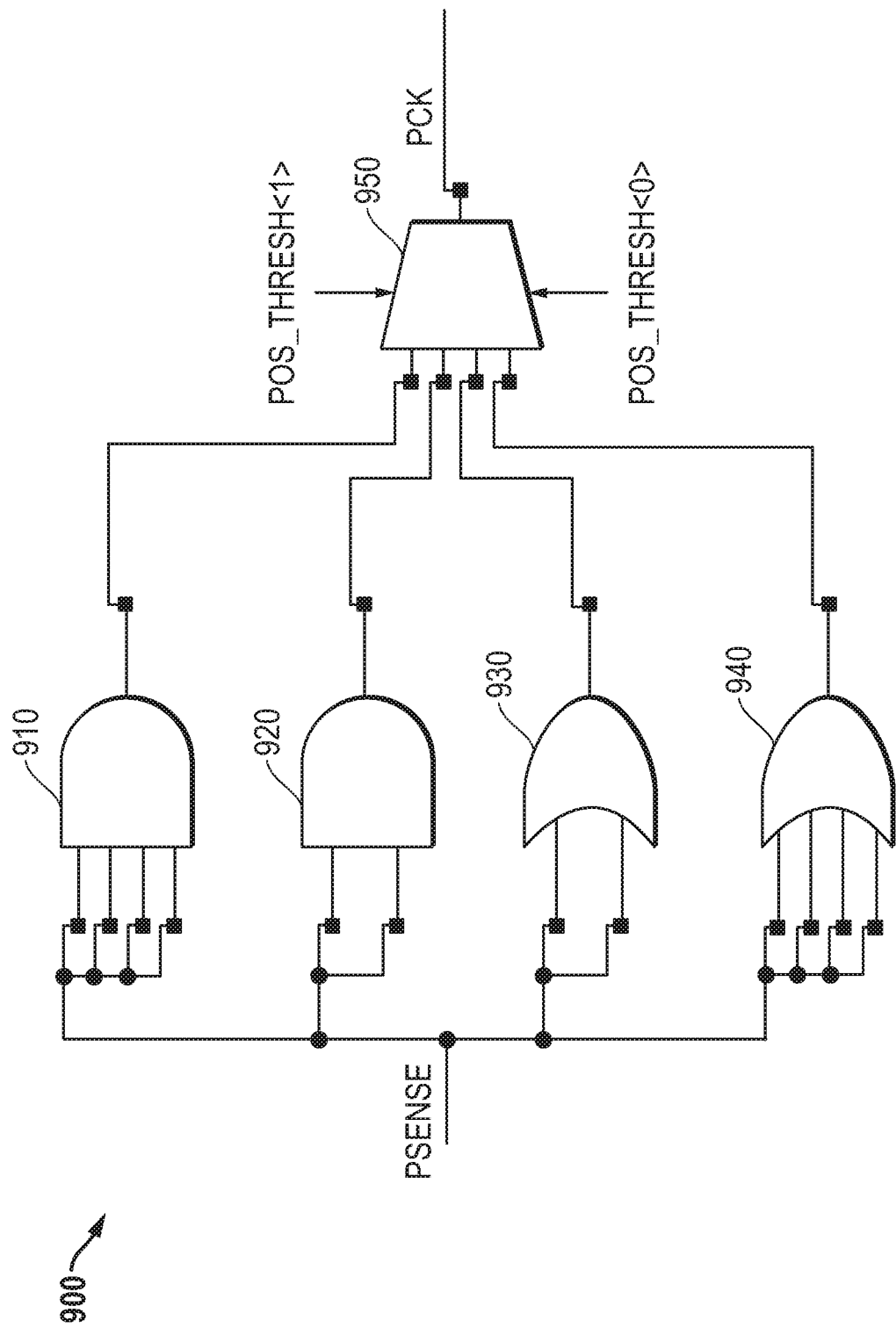
FIG. 9 illustrates in block diagram form a comparator that can be used in the detector circuit of FIGS. 7 and 8 according to some embodiments.

FIG. 9 illustrates in block diagram form a comparator 900 that can be used in the detector circuits of FIGS. 7 and 8 according to some embodiments. Comparator 900 includes AND gates 910 and 920, OR gates 930 and 940, and a selector 950. AND gate 910 is a 4-input AND gate having first through fourth inputs each for receiving a signal labeled "PSENSE", and an output. AND gate 920 is a 2-input AND gate having first and second inputs each receiving the PSENSE signal, and an output. OR gate 930 is a 2-input OR gate having first and second inputs each receiving the PSENSE signal, and an output. OR gate 940 is a 4-input OR gate having first through fourth inputs each for receiving the PSENSE signal, and an output. Selector 950 has a first input connected to the output of AND gate 910, a second input connected to the output of AND gate 920, a third input connected to the output of OR gate 930, a fourth input connected to the output of OR gate 940, a first control input for receiving a signal labeled POS_THRES<0>, a second control input for receiving a signal labeled POS_THRES<1>, and an output for providing a signal labeled "PCK".

Comparator 900 allows control of the sensitivity of the detector circuit by selectively altering its threshold voltage using only digital standard cells. If used in comparator 822 in EMFI sensor 800 of FIG. 8, the PSENSE signal is the signal provided by the second end of positive sense loop 811, and the PCK signal is the signal provided to the CK input of flip-flop 824. Each logic gate has a different threshold voltage, and POS_THRES<0> and POS_THRESH<1> select which logic gate is used to form the signal provided to the CK input of flip-flop 824. Thus a comparator with a selectable threshold voltage can be formed using only digital standard cells. A comparable inverting comparator with a selectable threshold that could be used in comparator 826 of FIG. 8 can be formed by merely adding an inverter between the output of selector 950 and the CK input of flip-flop 828.

Figure 10:
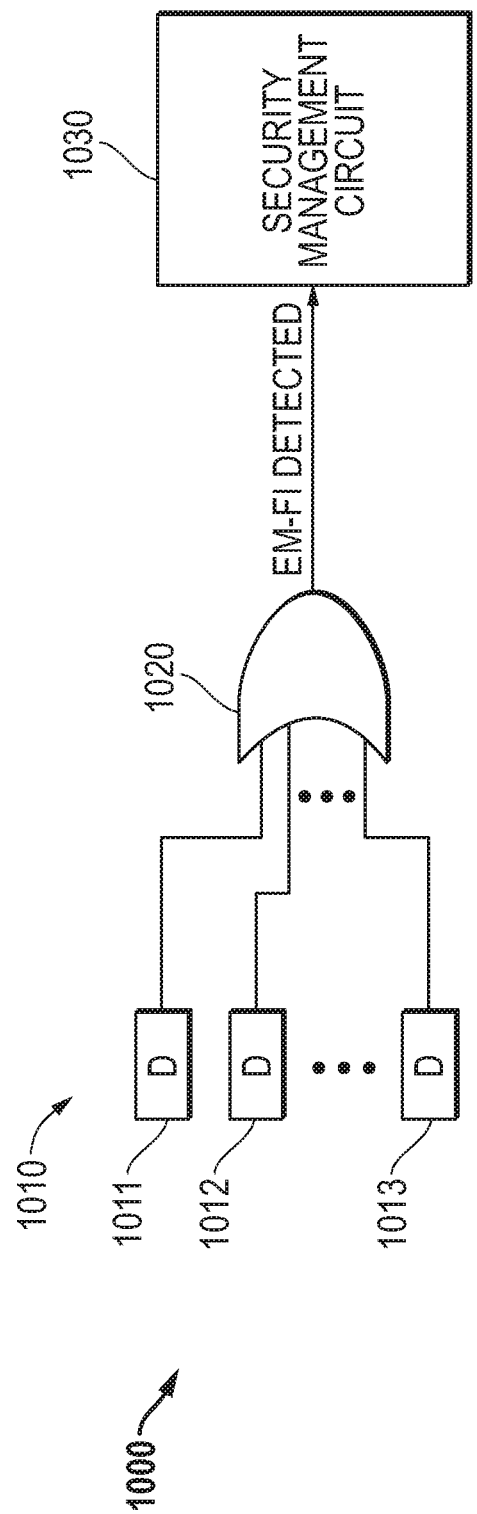
FIG. 10 illustrates in block diagram form an EMFI detection processing circuit that can be used in the security management circuit of FIG. 3.

FIG. 10 illustrates in block diagram form an EMFI detection processing circuit 1000 that can be used in security management circuit 318 of FIG. 3. EMFI detection processing circuit 1000 includes a set of EMFI detector circuits 1010, an OR gate 1020, and a security management circuit 1030. EMFI detector circuits 1010 include representative detector circuits 1011, 1012, and 1013, each selectively activating an output signal at a logic high to indicate that an EMFI pulse was detected in its corresponding sense loop. OR gate 1020 has inputs connected to outputs of respective detector circuits, and an output for providing a signal labeled "EMFI DETECTED" to an input of security management circuit 1030. Security management circuit 1030 represents the remainder of security management circuit 318. Thus, it would include circuitry to implement any of the protection actions described above.

Figure 11:
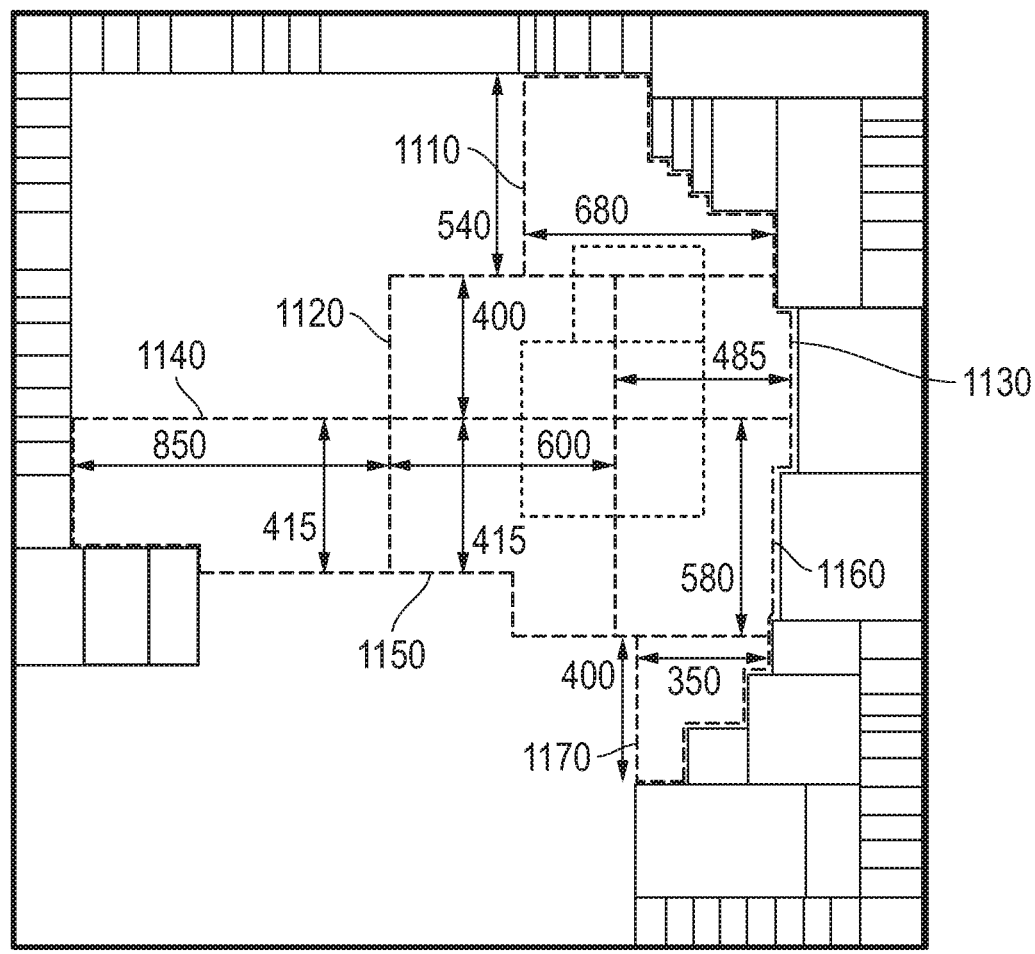
FIG. 11 illustrates a top view of a portion of an integrated circuit floorplan having overlapping sense loops and showing dimensions of a first layer of sense loops.

FIG. 11 illustrates a top view 1100 of a portion of an integrated circuit floorplan having overlapping sense loops and showing dimensions of a first layer of sense loops. The integrated circuit floorplan includes a typical layout in which digital circuitry is placed among and adjacent to analog circuit blocks or open areas. In this example, the shapes of the polygons that define the sense loops are irregular. The integrated circuit floorplan includes polygons 1110, 1120, 1130, 1140, 1150, and 1160, having dimensions shown in μm.

Figure 12:
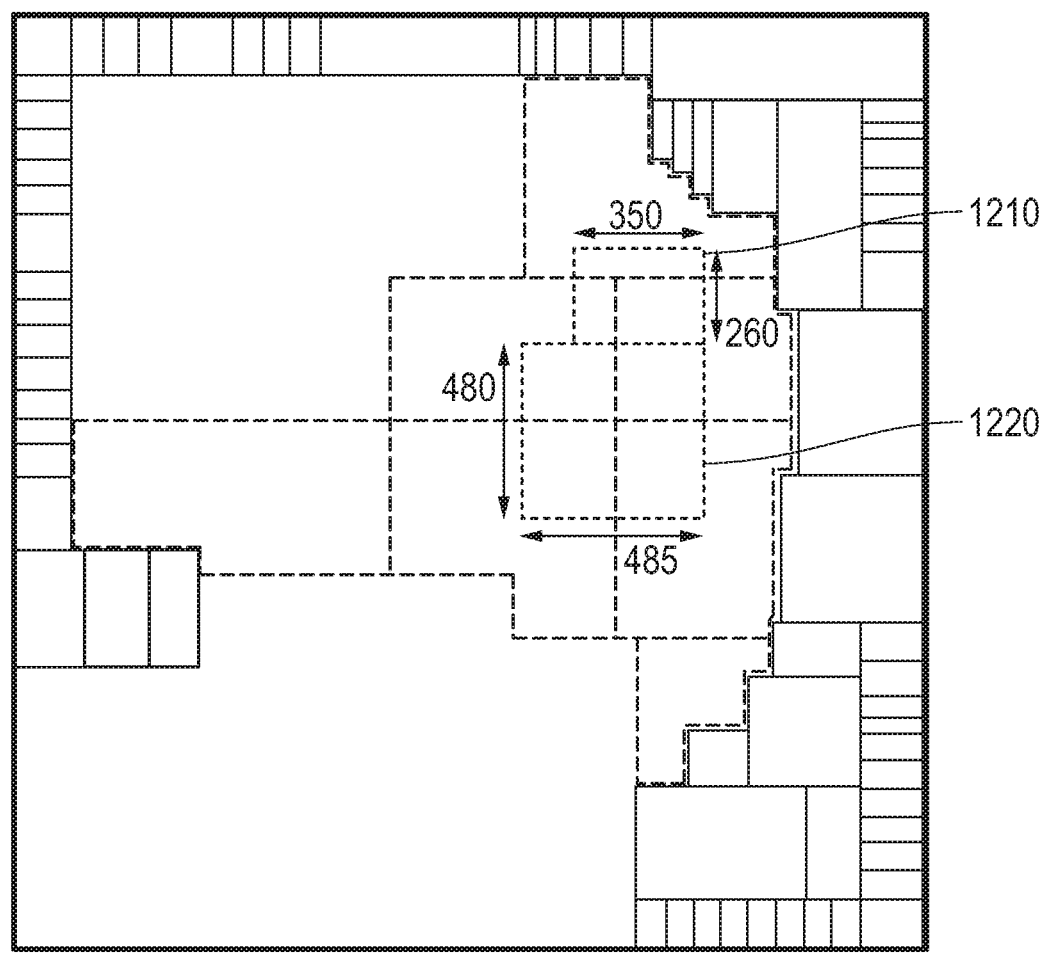
FIG. 12 illustrates a top view of the integrated circuit floorplan of FIG. 11 having the same overlapping sense loops but showing dimensions of a second layer of sense loops.

FIG. 12 illustrates a top view 1200 of the integrated circuit floorplan of FIG. 11 having the same overlapping sense loops but showing dimensions of a second layer of sense loops. The integrated circuit floorplan includes polygons 1210 and 1220 in the second layer, having dimensions shown in μm. The sense loops in the first and second layers are believed to be sufficient to protect against a localized EMFI pulse produced by an EMFI probe having a diameter on the order of 200 μm.

Figure 13:
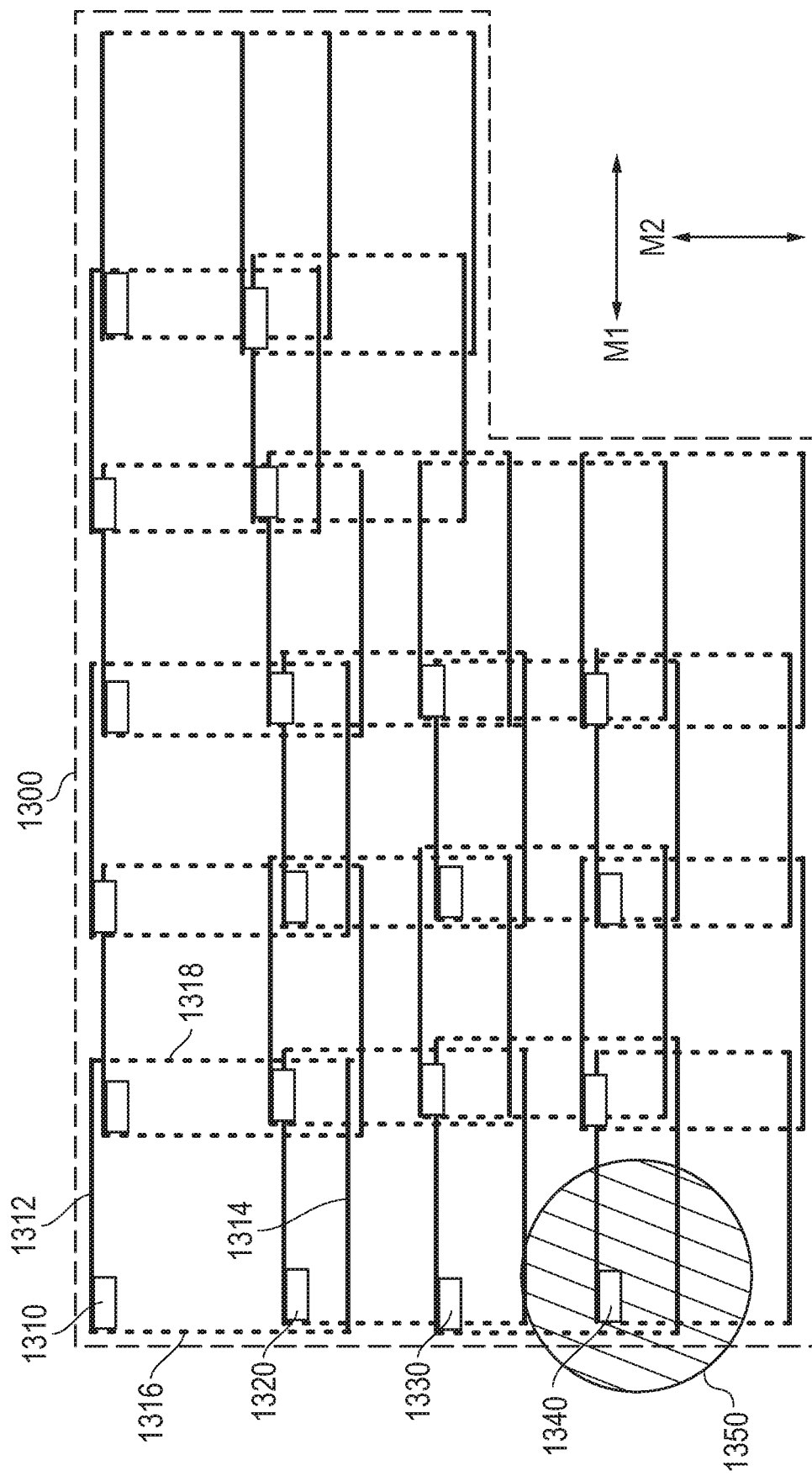
FIG. 13 illustrates a top view of an EMFI sensor array with overlapping sets of sense loops according to another embodiment of the present disclosure.

FIG. 13 illustrates a top view of an EMFI sensor array 1300 with overlapping sets of sense loops according to another embodiment of the present disclosure. EMFI sensor array 1300 includes an array of EMFI sensors that use different metal layers to form each sense loop, in which the horizontal loop segments or "routes" are in one metal layer, and the vertical loop routes are in another metal layer. For example, a first EMFI sensor is formed by a detector circuit 1310 shown as a rectangle in the upper left corner of a sense loop formed by a horizontal metal segment 1312 at the top and a horizontal metal segment 1314 at the bottom in a certain metal layer labeled "M1", and a vertical metal segment 1316 at the left and a vertical metal segment 1318 at the right in a different metal layer labeled "M2". The horizontal and vertical metal segments are connected to together using inter-metallic vias as the corners of the sense loop.

Likewise, a second EMFI sensor that overlaps the first EMFI sensor is formed using two horizontal metal segments in M1 and two vertical segments in M2 connected with vias at the corners and having a detector circuit 1320 in the top left corner. Proceeding downward, EMFI sensor array 1300 includes two additional EMFI sensors following this same pattern with detector circuits 1330 and 1340 in their top left corners overlap the first two vertically. Proceeding rightward, EMFI sensor array 1300 includes additional EMFI sensors horizontally overlapping with the right portions of previous sensors in the array.

EMFI sensor array 1300 shows a way of forming each sense loop in multiple metal layers to allow the sensor array to include an array of horizontally and vertically overlapping sense loops. When an EMFI pulse 1350 is applied, it can be detected by multiple sense loops. Moreover, since the metal segments are in different metal layers based on their direction, they can be conveniently interspersed with existing signal routes with only a small impact on chip layout.

Figure 14:
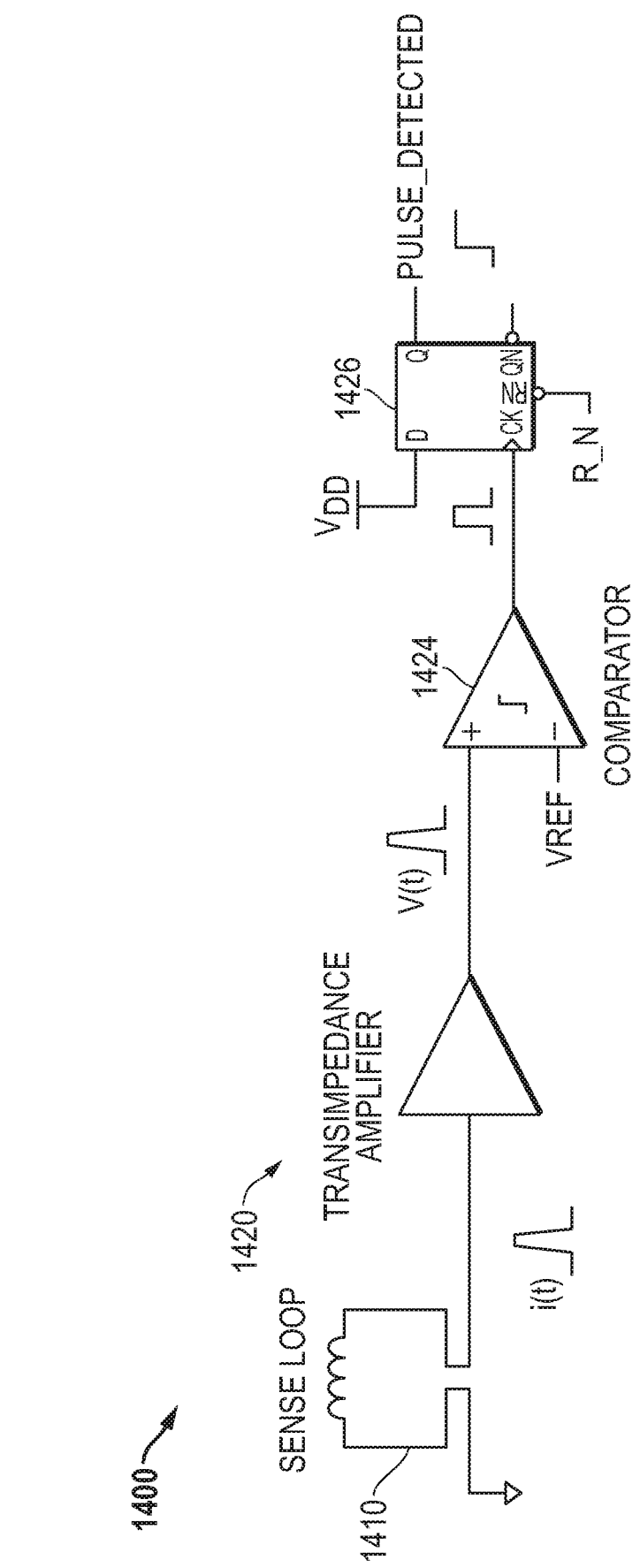
FIG. 14 illustrates in partial block diagram and partial schematic form another EMFI sensor that can be used in the sense loops of FIGS. 4 and 6.

FIG. 14 illustrates in partial block diagram and partial schematic form another EMFI sensor 1400 that can be used in the sense loops of FIGS. 4 and 6. EMFI sensor 1400 includes a sense loop 1410, a transimpedance amplifier 1422, a comparator 1424, and a flip-flop 1426. Sense loop 1410 has a first end connected to ground, and a second end, and is used to detect a positive EMFI pulse. Transimpedance amplifier 1422 has an input connected to the second end of sense loop 1410, and an output. Comparator 1424 has a positive input connected to the output of transimpedance amplifier 1422, a negative input for receiving $V_{REF}$, and an output. Flip-flop 1426 is a clocked D flip-flop having a D input connected to $V_{DD}$, a clock input CK connected to the output of comparator 1424, an active-low reset input RN for receiving reset signal R_N, and a Q output providing the POSITIVE_PULSE_DETECTED signal. Transimpedance amplifier 1422 converts a current pulse induced by the changing magnetic field into a voltage pulse. When the voltage pulse exceeds $V_{REF}$, the output of comparator 1424 goes high, clocking flip-flop 1426 and setting its Q output, signal POSITIVE_PULSE_DETECTED, to a logic high. A corresponding negative pulse detector circuit can be formed using a corresponding pattern.

Thus, in one form, an integrated circuit with protection against malicious EMFI pulse attacks has been described. The integrated circuit uses an array of EMFI sensors. Each of the EMFI sensors includes a sense loop in which a localized EMFI pulse induces a current and voltage pulse, and a detector circuit. The sense loop is a conductor around a corresponding portion of digital logic circuitry whose operation is affected by an EMFI pulse. The detector circuit is connected to the sense loop and has an output for providing a pulse detection signal in response to an EMFI pulse of at least a predetermined magnitude. A security management circuit performs a protection operation to secure the integrated circuit in response to an activation of a corresponding pulse detection signal of at least one of the EMFI sensors. In one form, the plurality of EMFI sensors can be formed as two overlapping layers.

The above-disclosed subject matter is to be considered illustrative, and not restrictive, and the appended claims are intended to cover all such modifications, enhancements, and other embodiments that fall within the scope of the claims. For example, each sensor loop can be implemented as one or multiple turns of wires. Note however that since an N turn loop has N times the capacitance and N times the resistance, the bandwidth would be reduced by a factor of $N^2$. Sensitivity would increase by a factor of N for glitches that are wide in time, but would decrease by a factor of N for narrow glitches. Thus, a single turn loop may be used for many integrated circuits.

The sensor loops can be formed in one dedicated metal layer, or can be virtual loops formed using horizontal and vertical routes in corresponding metal layers and connected at the corners using metal-to-metal vias. The detector circuits can be formed in various ways. For example, positive and negative detector circuits can sense a pulse on a sensor loop biased to a mid-supply voltage, or each EMFI sensor can use separate sense loops and detector circuits for positive and negative EMFI pulse detectors. The sense loops can have regular shapes such as squares and can be tiled across large logic circuit areas, or they can have irregular polygonal shapes to provide EMFI pulse detection for small, irregularly shaped digital logic circuit areas.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for designing an integrated circuit with protection against an electromagnetic fault injection, comprising:

identifying a digital logic circuit area to be protected, said digital logic circuit area comprising logic circuitry whose operation is affected by the electromagnetic fault injection;

associating a plurality of sub-areas with corresponding ones of a plurality of electromagnetic fault injection sensors, said associating comprising defining a size of a sense loop for each of said plurality of electromagnetic fault injection sensors, said sense loop comprising a conductor around a corresponding portion of logic circuitry;

determining a number of said plurality of electromagnetic fault injection sensors of said size to cover said digital logic circuit area using overlapping sense loops;

laying out said sense loop of each of said plurality of electromagnetic fault injection sensors; and
coupling a respective detector circuit having an output for providing a pulse detection signal in response to a pulse of at least a predetermined magnitude to said sense loop of each of said plurality of electromagnetic fault injection sensors, and
coupling a security management circuit to outputs of said respective detector circuits in said sense loop of each of said plurality of electromagnetic fault injection sensors, wherein said security management circuit is adapted to perform a security operation in response to an activation of an output of at least one respective detector circuit of each of said plurality of electromagnetic fault injection sensors.

2. The method of claim 1, further comprising:
auto-routing a layout of logic circuitry of the integrated circuit inside respective sense loops of said plurality of electromagnetic fault injection sensors in a plane of the integrated circuit.

3. The method of claim 1, wherein said laying out said sense loop of each of said plurality of electromagnetic fault injection sensors comprises:
laying out said sense loop of each of said plurality of electromagnetic fault injection sensors so that said sense loop of each of said plurality of electromagnetic fault injection sensors overlaps said sense loop of another one of said plurality of electromagnetic fault injection sensors.

4. The method of claim 3, further comprising:
forming said sense loop of each of said plurality of electromagnetic fault injection sensors in both a first metal layer and a second metal layer of the integrated circuit.

5. An integrated circuit including a plurality of electromagnetic fault injection sensors, each of said plurality of electromagnetic fault injection sensors comprising:
a sense loop comprising a conductor around a corresponding portion of logic circuitry whose operation is affected by an electromagnetic pulse, wherein said sense loop comprises a positive sense loop having a first end for receiving a negative reference voltage, and a second end, and a negative sense loop having a first end for receiving a positive reference voltage, and a second end; and
a detector circuit coupled to said sense loop and having an output for providing a pulse detection signal in response to a pulse of at least a predetermined magnitude, comprising a comparator having an input coupled to said second end of one of said positive sense loop and said negative sense loop, and an output, and a latch having an input coupled to said output of said comparator, and an output for providing a pulse detected signal in response to an activation of said output of said comparator.

6. The integrated circuit of claim 5, wherein said sense loop of each of said plurality of electromagnetic fault injection sensors overlaps said sense loop of at least another one of said plurality of electromagnetic fault injection sensors.

7. The integrated circuit of claim 6, wherein said sense loop of each of said plurality of electromagnetic fault injection sensors is implemented in both a first metal layer and a second metal layer of the integrated circuit.

8. The integrated circuit of claim 5, wherein said comparator comprises:

at least one logic gate each having an input coupled to said second end of said one of said positive sense loop and negative sense loop, and an output, wherein said at least one logic gate has a circuit programmable threshold.

9. The integrated circuit of claim 8, wherein:
said positive reference voltage corresponds to a power supply voltage;
said negative reference voltage corresponds to a ground voltage; and
the sense loop further comprises:
a first clamp coupled to said second end of said positive sense loop that limits a positive voltage on said second end of said positive sense loop to said power supply voltage plus a first predetermined voltage and a negative voltage on said second end of said positive sense loop to said ground voltage minus a second predetermined voltage; and
a second clamp coupled to said second end of said negative sense loop that limits a negative voltage on said second end of said negative sense loop to said power supply voltage plus a first predetermined voltage and a negative voltage on said second end of said negative sense loop to said ground voltage minus a second predetermined voltage.

10. The integrated circuit of claim 5, further comprising:
a security management circuit for performing a protection operation to secure the integrated circuit in response to an activation of a corresponding pulse detection signal of one of said plurality of electromagnetic fault injection sensors.

11. The integrated circuit of claim 10, further comprising:
a digital logic circuit area whose operation is affected by said electromagnetic pulse, comprising said plurality of electromagnetic fault injection sensors; and
an analog circuit area coupled to said digital logic circuit area.

12. An integrated circuit including a plurality of electromagnetic fault injection sensors, each of said plurality of electromagnetic fault injection sensors comprising:
a sense loop comprising a conductor around a corresponding portion of logic circuitry whose operation is affected by an electromagnetic pulse, wherein said sense loop has a first end for receiving a first reference voltage, and a second end, and the integrated circuit operates using a power supply voltage and a ground voltage, and said first reference voltage is between said power supply voltage and said ground voltage; and
a detector circuit coupled to said sense loop and having an output for providing a pulse detection signal in response to a pulse of at least a predetermined magnitude, comprising a comparator having a first input for receiving a second reference voltage different from said first reference voltage by a first predetermined amount, a second input coupled to said second end of said sense loop, and an output, and a latch having an input coupled to said output of said comparator, and an output for providing a pulse detected signal in response to an activation of said output of said comparator.

13. The integrated circuit of claim 12, wherein said sense loop of each of said plurality of electromagnetic fault injection sensors overlaps said sense loop of at least another one of said plurality of electromagnetic fault injection sensors.

14. The integrated circuit of claim 12, wherein said sense loop of each of said plurality of electromagnetic fault injection sensors is implemented in both a first metal layer and a second metal layer of the integrated circuit.

15. The integrated circuit of claim 12, further comprising:
a security management circuit for performing a protection operation to secure the integrated circuit in response to an activation of a corresponding pulse detection signal of one of said plurality of electromagnetic fault injection sensors.

16. The integrated circuit of claim 15, further comprising:
a digital logic circuit area whose operation is affected by said electromagnetic pulse, comprising said plurality of electromagnetic fault injection sensors; and
an analog circuit area coupled to said digital logic circuit area.

17. An integrated circuit, comprising:
a plurality of electromagnetic fault injection sensors, each of said plurality of electromagnetic fault injection sensors comprising
  a sense loop comprising a conductor around a corresponding portion of logic circuitry whose operation is affected by an electromagnetic pulse; and
  a detector circuit coupled to said sense loop and having an output for providing a pulse detection signal in response to a pulse of at least a predetermined magnitude,
  wherein said sense loop of each of said plurality of electromagnetic fault injection sensors overlaps said sense loop of at least another one of said plurality of electromagnetic fault injection sensors.

18. The integrated circuit of claim 17, wherein said sense loop of each of said plurality of electromagnetic fault injection sensors is implemented in both a first metal layer and a second metal layer of the integrated circuit.

19. The integrated circuit of claim 17, further comprising:
a security management circuit for performing a protection operation to secure the integrated circuit in response to an activation of a corresponding pulse detection signal of one of said plurality of electromagnetic fault injection sensors.

20. The integrated circuit of claim 17, further comprising:
a digital logic circuit area whose operation is affected by said electromagnetic pulse, comprising said plurality of electromagnetic fault injection sensors; and
an analog circuit area coupled to said digital logic circuit area.

* * * * *